United States Patent [19]

Witherspoon et al.

[11] 4,312,931
[45] Jan. 26, 1982

[54] ZINC ELECTRODE CONTAINING POROUS CALCIUM SILICATE

[75] Inventors: Romeo R. Witherspoon, Utica; Stuart G. Meibuhr, Birmingham, both of Mich.

[73] Assignee: General Motors Corporation, Detroit, Mich.

[21] Appl. No.: 183,264

[22] Filed: Sep. 2, 1980

[51] Int. Cl.³ .............................................. H01M 4/62
[52] U.S. Cl. ..................................... 429/229; 429/231
[58] Field of Search ............... 429/229, 231, 214, 215, 429/212, 232

[56] References Cited

U.S. PATENT DOCUMENTS

| | | | |
|---|---|---|---|
| 3,476,601 | 11/1969 | Berger et al. | 429/229 X |
| 3,497,387 | 2/1970 | Amiet | 429/229 X |
| 3,516,862 | 6/1970 | Van der Grinten | 429/229 X |
| 3,703,413 | 11/1972 | Arrance | 429/231 X |
| 3,761,315 | 9/1973 | Smatko | 429/229 |
| 3,806,368 | 4/1974 | Maricle et al. | 429/105 |
| 3,864,168 | 2/1975 | Casey, Jr. et al. | 429/229 |
| 3,933,520 | 1/1976 | Gay et al. | 429/103 |
| 4,041,221 | 8/1977 | Berchielli et al. | 429/229 X |
| 4,085,241 | 4/1978 | Sheibley | 427/385 B |

Primary Examiner—Anthony Skapars
Attorney, Agent, or Firm—Douglas D. Fekete

[57] ABSTRACT

An improved shape-stable zinc electrode is described for use in a zinc/nickel oxide cell and comprises a diatomaceous calcium silicate material to retain zincate ions in the area that they form for subsequent recovery there of the zinc.

3 Claims, No Drawings

ZINC ELECTRODE CONTAINING POROUS CALCIUM SILICATE

BACKGROUND OF THE INVENTION

This invention relates to a stable zinc electrode for use in a secondary battery having an alkaline electrolyte. More particularly, this invention relates to a zinc electrode comprising a particular porous material for entrapping zinc species in the discharged state and retaining it near the electrode for recovery during recharging.

During discharge of a zinc/nickel oxide battery, zinc of the negative electrode forms zincate anion, $Zn(OH)_4^{-2}$, that dissolves in the alkaline electrolyte and diffuses throughout the cell. When the cell is recharged, the zinc is mostly recovered, but its distribution on the electrode is significantly different. Active zinc material is lost from the perimeter of the electrode and redeposited towards the center. This shape change reduces effective surface area of the electrode and thereby cell capacity. The redeposited zinc is denser and less porous, which causes the electrode to passivate at low current densities. Also, zinc dendrites may form and penetrate the separator to create short circuits within the cell. Thus, zincate ion diffusion substantially reduces the useful life of the cell.

Calcium hydroxide has been added to zinc electrodes to minimize the solubility of the zincate anion and thereby stabilize the electrode. However, the required amount of calcium hydroxide significantly thickens the electrode and lowers the energy density of the cell. Also, calcium hydroxide is only effective for relatively low electrolyte alkaline concentrations, for example, about 20 weight percent. Higher alkaline concentrations of 30% or greater are desired to reduce electrolyte resistance and freezing point.

Therefore, it is an object of this invention to provide a shape-stable zinc electrode for extending the useful life of an electrochemical cell wherein the zinc electrode is in contact with an alkaline electrolyte. The electrode traps zincate ions during discharge and retains the zinc near its predischarge location for recovery during recharging. Thus, zinc at the electrode perimeter prior to discharge is recovered near the perimeter, and does not diffuse into the bulk of the electrolyte. A relatively small amount of the zinc-trapping material improves the distribution and density of the redeposited zinc, without significantly interfering with cell performance.

It is also an object of this invention to provide an improved zinc electrode for use in a cell having a relatively concentrated alkaline electrolyte, for example, 30% or more potassium hydroxide, which electrode comprises a highly porous insoluble silicate material evenly distributed throughout the electrode to act as a reservoir for storing zincate ions near where they are formed. The material physically traps zincate ions, in contrast to electrode additives which seek to tie up zincate ions chemically.

SUMMARY OF THE INVENTION

In a preferred embodiment, an improved zinc electrode comprises a synthetic calcium silicate that is produced from diatomite. Diatomite, also called diatomaceous earth, is a substantially silica deposit composed of skeletons of diatoms, prehistoric single-celled aquatic plants. When reacted with lime (calcium hydroxide) the deposit produces a calcium silicate material that is substantially insoluble in alkaline electrolyte. However, the reaction product retains the original diatomite skeletal structure comprising very small openings and many pockets for absorbing and retaining solution. Typically, the material is able to absorb about five times its weight in water. The diatomaceous calcium silicate is blended with zinc active agent, plus small amounts of a hydrogen suppressor and a polymer binder, and formed into the electrode. The product electrode contains 5 to 15 weight percent of the material. The electrode is employed as a negative element in a cell comprising a nickel oxide positive electrode and a concentrated potassium hydroxide electrolyte.

When zincate ions are formed during discharge, the nascent ions are collected in nearby diatomaceous pockets within the electrode. The small skeletal openings substantially retard diffusion into the bulk of the electrolyte solution. During recharging, zinc is recovered near where it originated. Therefore, zinc migration from the perimeter to the center of the electrode is reduced and the electrode retains its shape for more cycles. Zinc densification is also reduced. Furthermore, diffusion of the zinc species through the pores of the separator is retarded, which reduces dendrite growth. The overall result is a substantial improvement in the useful lifetime of the cell.

DETAILED DESCRIPTION OF THE INVENTION

In a preferred embodiment, negative zinc electrodes containing a diatomaceous calcium silicate material were prepared by a vacuum table process. The preferred material is commercially obtained from the Johns-Manville Products Corporation under the trade designation Micro-Cel C. The fine chaulky white powder is the hydrothermal reaction product of high silica diatomite and lime and contains less that 1% iron. The powder is further characterized by an ability to absorb up to about 450% of its original weight of water and appear essentially dry. The high porosity is also indicated by a relatively low density of 0.12 $g/cm^3$ and a relatively high surface area of 175 $m^2/g$. The pH of a 10% water slurry is about 9.8.

About 9 parts by weight of diatomaceous calcium silicate was mixed with about 1.5 parts mercuric oxide (hydrogen suppressor), about 5 parts fibrous polymer binder, about 84.5 parts powdered zinc oxide and about 2000 parts water to produce a uniform slurry. The preferred binder comprises polyethylene fibers containing polyvinyl alcohol and is available from the Crown Zellerback Company under the trade designation SWP E620. The slurry was poured onto a filter paper, using a frame to control spreading. Suction was applied through the filter paper to remove excess water and produce a wet cake. Two wet cakes were pressed to opposite sides of an expanded copper grid having a protective lead-tin plate and the assembly was dried in a circulating air oven for 20 minutes at 100° C. In this example, the product electrode was about 4.8 cm by 8 cm.

The negative zinc electrode was assembled into a 3.6 kC trielectrode cell for testing. The electrode was wrapped in a microporous polypropylene separator, commercially available from Celanese Plastics Company and designated Celgard 3401. The wrapped electrode was sandwiched between two positive nickel oxide electrodes. The nickel oxide electrodes were also formed by a vacuum table process. A mixture was first prepared comprising 61.9 parts by weight nickel hydroxide, 3.3 parts cobalt hydroxide and 16.3 parts graphite powder. To this mixture were added 9.7 parts carbon fibers, 8.9 parts polytetrafluoroethylene emulsion (DuPont PTFE T-30B), and water to form a slurry. The slurry was poured onto a filter paper and excess water was removed by suction. The wet cake was pressed to a nickel current collector and dried to form the electrode. The equivalent ratio of zinc to nickel within the cell was about 3 to 1. The elements were snugly fitted into a case, which was then filled with an electrolyte containing 37.5 weight percent potassium hydroxide, 60 g/l zinc oxide and 23 g/l lithium hydroxide hydrous.

The cell was initially charged by suitably applying an electrical current to the electrodes at a rate of about 0.1 A or about 1/10 capacity per hour, for twenty hours. The cell was discharged at a rate of ½ capacity per hour to 1.0 volts, and thereafter shorted to zero volt. The cell was again charged at the 1/10 capacity rate, drained of free electrolyte, evacuated to about 6 KPa and cycle tested.

Testing consisted of discharging at an hourly rate of about ½ capacity (0.5A) to about 1.0 volt and thereafter recharging at an hourly rate at about 1/6 capacity plus 5% (about 0.175A). Testing was discontinued when the cell capacity decayed below 70% its theoretical value. The cell comprising diatomaceous calcium silicate demonstrated 70% capacity after 230 cycles. In contrast, a cell comprising a conventional zinc electrode that contained no diatomaceous material survived only about 140 cycles. After testing, the zinc electrodes were inspected visually and radiographically. The conventional electrode showed a substantial shape change and accumulation of dense zinc at the center, leaving a wide zinc-free border. However, and in spite of the extended cycling, zinc in the presence of diatomaceous calcium silicate was more evenly distributed and less zinc loss at the perimeter was observed. The diatomaceous material also improved the porosity of the zinc deposit and noticeably reduced dendrite growth.

In a second example, a 30.6 kC capacity cell was constructed with similar electrodes containing 9 weight percent diatomaceous calcium silicate. Three 10 cm×10 cm negative zinc electrodes were assembled into a cell compising two full-capacity positive and two outer half-capacity positive electrodes and containing the aforementioned 37.5 weight percent potassium hydroxide electrolyte. The microporous separators were composed of about 70 weight percent talc, 10 weight percent calcium acetate and 20 weight percent polytetrafluoroethylene. After initial charging, the cell was cycled by discharging at ½ capacity per hour to 1.0 volt and recharging at about 1/6 capacity per hour. The cell retained 75% capacity after 152 cycles. In contrast, a similar cell having conventional zinc electrodes fell below 75% capacity after about 52 cycles. Substantially less electrode shape change and perimeter zinc loss was observed in the presence of diatomaceous calcium silicate, despite the difference in cycling.

The preferred calcium silicate material is produced by hydrothermally reacting diatomite with calcium hydroxide to form an alkaline insoluble product. Its formula may be expressed as $CaO.2SiO_2$. The calcium product is readily available and therefore preferred, although insoluble products of other alkaline earth metals may also be suitable. An important feature of the product is its high porosity that results from the diatom skeleton. In a typical example, the microscopic diatom is housed in a silica shell shaped like a pillbox and having numerous tiny openings and chambers in the thin lacework walls. Therefore, the volume of the diatom fossil (unreacted) is over 90% void. The reaction product preferably absorbs at least 4 times its weight in water. When incorporated into a zinc electrode, dissolved zincate ions are trapped within the porous structure before they are able to diffuse away from the electrode. By distributing the diatomaceous material throughout the electrode, a zincate ion is trapped near where it forms. Thus, during recharging, the zinc is recovered near its originating site from a zincate ion trapped there. Since diffusion of zincate ions into the electrolyte generally favors zinc redeposition near the electrode center, the diatomaceous traps effectively reduce shape change.

The zinc electrode preferably contains 5 to 15% diatomaceous calcium silicate based upon dry weight. Higher concentrations generally thicken the electrode and reduce cell capacity, with little additional benefit. Concentrations greater than about 20% undesirably increase resistance within the electrode and reduce cell output. The preferred calcium silicate contains minimum iron or other impurities that produce detrimental hydrogen overvoltages.

In the described examples, zinc electrodes containing diatomaceous calcium silicate were employed in zinc/nickel oxide cells. It is apparent that the electrodes are also suitable for use in other cells having alkaline electrolytes for controlling zincate ion solubility. Although particularly useful for reducing shape change in cells having high alkaline concentration, preferably greater than 30%, the synthetic calcium silicate is also effective with electrolytes containing relatively low potassium hydroxide concentrations, for example, 20 weight percent. The calcium silicate is inert to typical zinc electrode materials and may be employed with any suitable binder or hydrogen suppressor agents, including lead oxides or salts of cadmium or tin.

Although this invention has been described in terms of certain embodiments thereof, it is not intended that it be limited to the above description but rather only to the extent set forth in the claims that follow.

The embodiments of the invention in which an exclusive property or privilege is claimed are defined as follows:

1. In an electrode for use with an alkaline electrolyte in a secondary electrochemical cell and comprising an active zinc material that forms during discharge a zincate ion, the improvement wherein said electrode also comprises an electrolyte-insoluble diatomaceous silicate material.

2. In a negative electrode for use with an alkaline electrolyte in a secondary electrochemical cell, said electrode comprising an active zinc material that forms during discharge a zincate ion that is soluble in the electrolyte, the improvement wherein said electrode also comprises a diatomite-derived alkaline earth silicate material for improving the distribution of the zinc material recovered on the electrode during charging.

3. In a negative electrode for use in a secondary electrochemical cell having an alkaline electrolyte that contains greater than 30 weight percent potassium hydroxide, said electrode comprising an active zinc material that forms during discharge a zincate ion that is soluble in the electrolyte, the improvement wherein said electrode also comprises between 5 and 15 weight percent calcium silicate material derived from diatomite and characterized by an ability to absorb at least four times its weight in water, said material having a highly porous structure and being incorporated into the electrode in a manner suitable for retaining within said structure zincate ions that dissolve nearby for recovery of zinc therefrom during charging, said material thereby improving zinc distribution on the electrode after charging and extending the operating life of the cell.

* * * * *